J. T. FLAVIN.
FOUR WHEEL DRIVE MOTOR VEHICLE.
APPLICATION FILED AUG. 12, 1918.

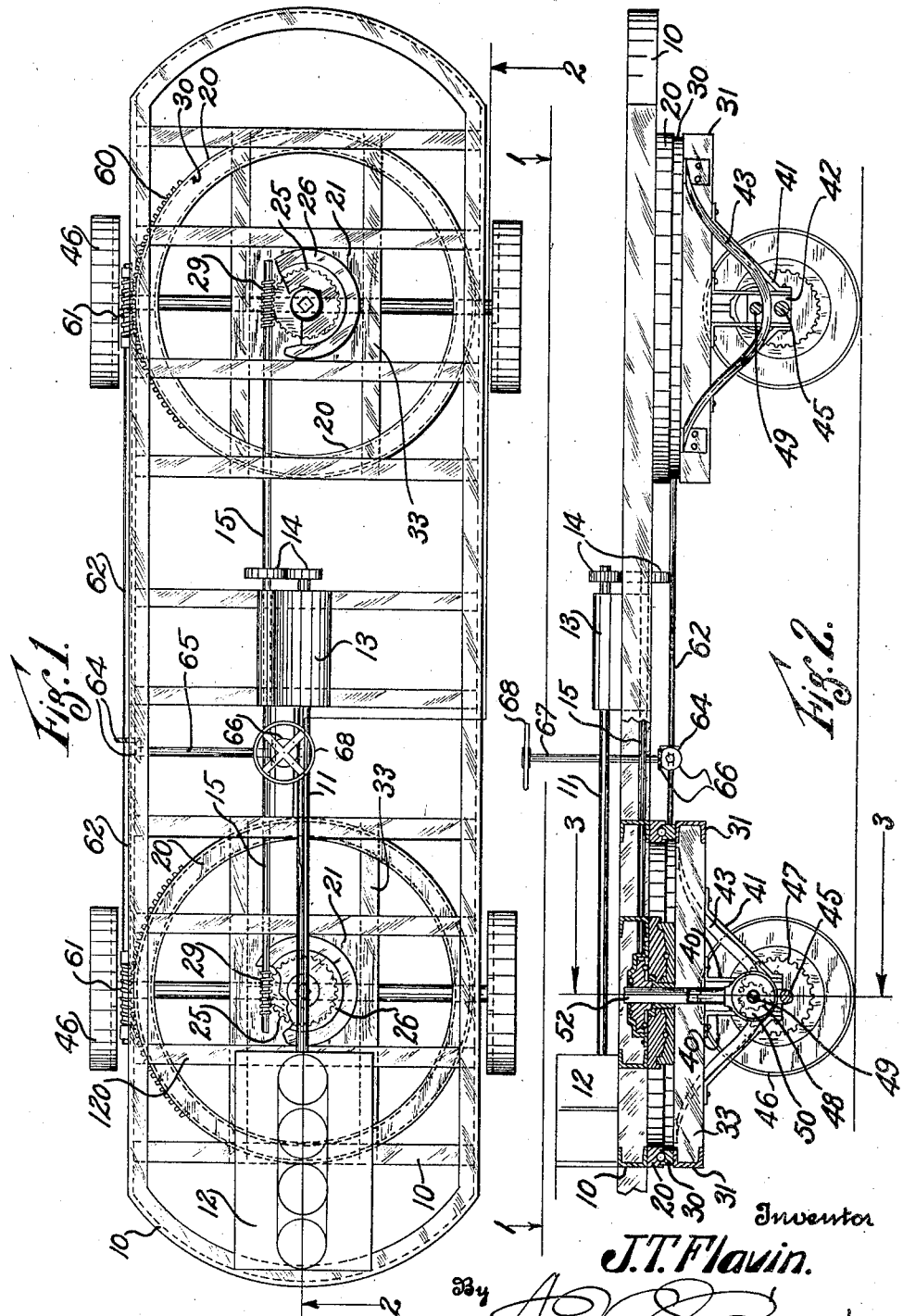

1,321,612.

Patented Nov. 11, 1919.
2 SHEETS—SHEET 2.

Inventor
J. T. Flavin.
By
Attorney

UNITED STATES PATENT OFFICE.

JOHN T. FLAVIN, OF DENVER, COLORADO.

FOUR-WHEEL-DRIVE MOTOR-VEHICLE.

1,321,612.   Specification of Letters Patent.   Patented Nov. 11, 1919.

Application filed August 12, 1918. Serial No. 249,419.

*To all whom it may concern:*

Be it known that I, JOHN T. FLAVIN, a citizen of the United States, residing at the city and county of Denver and State of Colorado, have invented certain new and useful Improvements in Four-Wheel-Drive Motor-Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to four-wheeled motor vehicles in which all wheels are driven, and the object thereof is the production of a strong, efficient structure which may be manufactured at low cost.

Briefly, the invention comprises a chassis having at each end a circular track with which a truck carrying a turn table coöperates so that each truck may turn. Both the track and the turntable have central bearings and through the centers of these bearings power is transmitted by a vertical shaft to the differential of each truck. The trucks are turned simultaneously for steering purposes by means of geared connections with the outer face of the turntable.

In the drawings:

Figure 1 is a plan as indicated by line 1—1 of Fig. 2.

Fig. 2 is a side view partly in section and partly in elevation as indicated by line 2—2 of Fig. 1.

Figure 3:
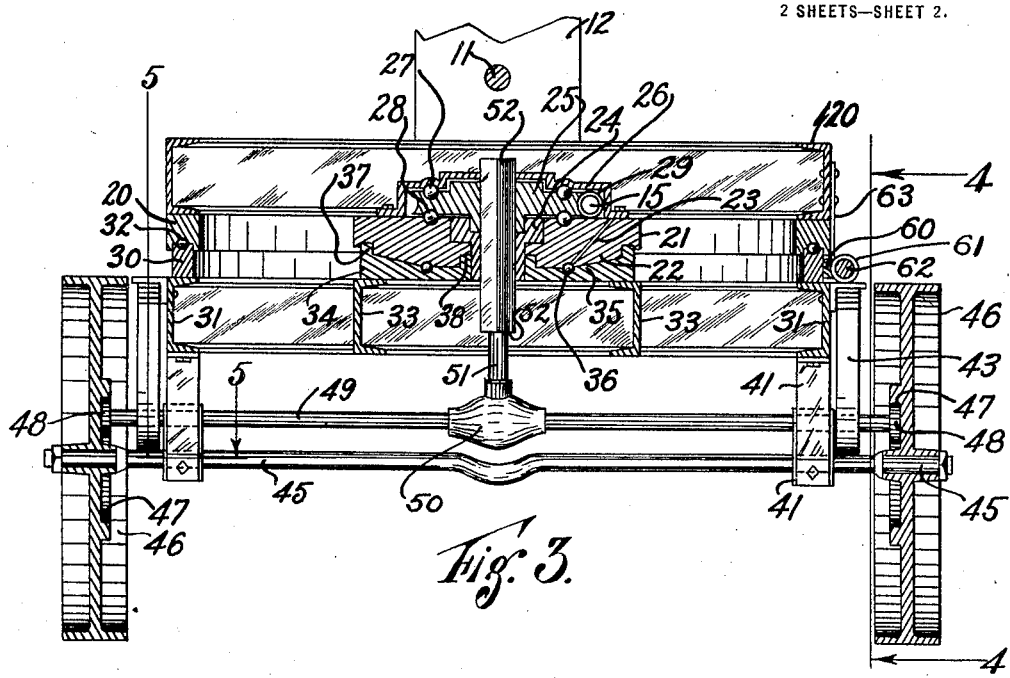
Fig. 3 is a vertical sectional view as indicated by line 3—3 of Fig. 2, but on a larger scale.
Figure 4:
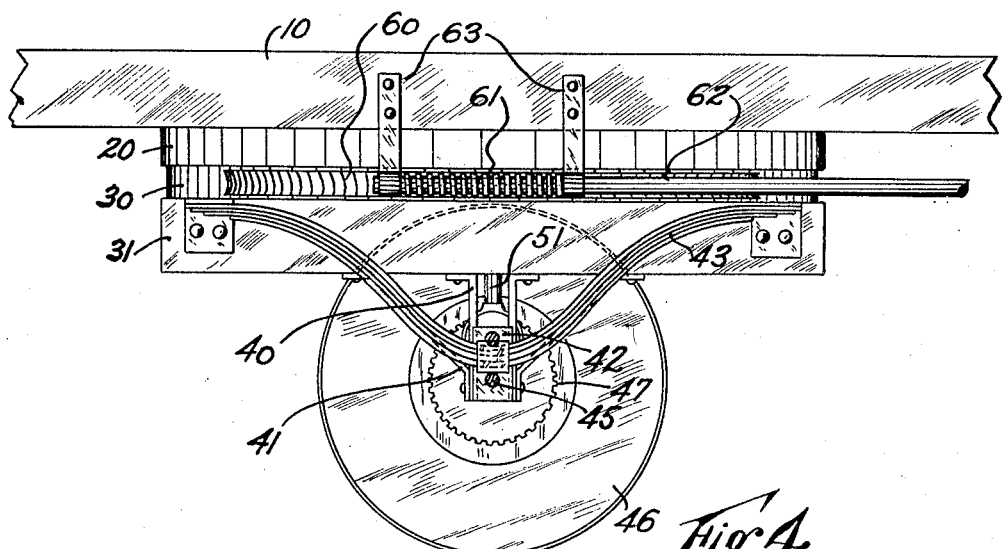
Fig. 4 is a side elevation on line 4—4 of Fig. 3.
Figure 5:
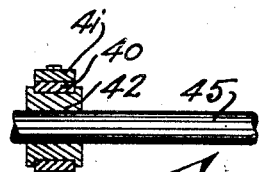
Fig. 5 is a detail on line 5—5 of Fig. 3.

The chassis 10 of the vehicle carries a motor 12 connected by crank shaft 11 with a clutch 13. The clutch 13 has a gear connection 14 with the power shaft 15 which extends to each end of the chassis for transmitting power to both sets of wheels.

Secured to the under side of the chassis at each end is a track 20 which has a centrally located bearing 21 suitably mounted by cross beams 120 on the chassis. The under part of this bearing has an offset portion 22 and an oil passage 23 extends through the bearing to the under face of this portion. Mounted in the center of the bearing is a sleeve 24 upon which there is mounted in turn a circular gear 25 inclosed in a casing 26 secured to the bearing 21. Ball races are provided in the casing and in the bearing for a series of balls 27, and ball races are also provided in the under face of the gear and the upper face of the bearing 21 to receive a series of ball-bearings 28. The gear 25 is engaged by a worm gear 29 on the end of the power shaft 15.

A turntable 30 mounted upon the framework 31 of each truck coöperates with the track 20, these two members having ball races for the reception of ball bearings 32 to facilitate movement of the turntable beneath the track. Mounted upon the central portion 33 of the truck framework is a bearing 34 having a recess 35 formed by an upstanding outer annular portion 37 and a similar inner ring 38, this recess accommodating the offset lower portion 22 of the bearing 21 and serving to make a stable bearing which will prevent displacement of the parts. Ball races are formed in the two bearings 21 and 34 for the reception of the balls 36, oil being supplied thereto by the duct 23.

Secured to the under face of the framework of each truck are standards 40 reinforced by braces 41, and between these standards journal blocks 42 are mounted. Springs 43 mounted on the truck framework 31 support the blocks 42. Journaled in the block 42 is the axle 45 carrying the wheels 46 provided with internal gears 47. Pinions 48 on jack shafts 49 also journaled in blocks 42 engage the internal gears 47. The jack shafts are connected with the differential 50 and receive power through the medium of the vertical drive shaft 51 whose upper portion 52 is squared and passes through a squared central opening in the sleeve 24, which extends through the lower bearing 34. The upper part of squared portion 52 is slidably positioned in a squared central opening in the gear 25. By this construction a pivot is formed about the vertical drive shaft 51 and the chassis, truck framework and bearings are allowed to rise and fall on the springs 43.

For steering purposes a gear segment 60 is provided on one side of each turntable 30 and is engaged by a worm gear 61 on the end of a longitudinally extending shaft 62 which runs to both trucks. Each end of this shaft 62 is supported in brackets 63 on the chassis. By means of a set of bevel gears 64, a short shaft 65 and a second set of bevel gears 66 the steering influence from steering post 67 and wheel 68 is transmitted to the worms 61 simultaneously. These worms 61 may be oppositely pitched to turn the trucks in opposite directions for making short turns as is obvious.

In operation power is transmitted through power shaft 15 and worm 29 thereon to gear 25, thence through the short vertical drive shaft 51 to the differential and by way of the jack shafts 49 to the wheels, the power being simultaneously applied to both the front and the rear truck. As above indicated, each truck is steered through the medium of the shaft 62 and worm 61 thereon which transmit the influence to the gear segment 60 on the turntable 30. In turning, the sleeve 21 extending through the bearings 25 and 34 constitutes a pivot. Bearing 34 turns on bearing 25 and the movement is facilitated by the balls 36. Simultaneously turntable 30 turns on track 20 and the movement is facilitated by balls 32.

It will thus be seen that by transmitting power through a pivot a truck may be steered and at the same time have both of its wheels driven. By this means both the front and rear trucks may be steered and all the wheels driven. This offers a cheap, strong and practical structure.

I claim:

1. In a motor vehicle, a chassis, a track on the under side thereof, a truck provided with wheels, a turntable on the truck cooperating with the track, a center bearing for the track and a center bearing for the turntable, one of said bearings having a recess and the other an offset portion to seat in said recess to position the bearings relatively, a centrally located vertical drive shaft extending through said bearings, a driving connection between the lower end of the drive shaft and the wheel, and a power connection for the upper end of the drive shaft.

2. In a motor vehicle, a chassis, a track on the under side thereof, a truck provided with wheels, a turntable on the truck cooperating with the track, a center bearing for the track and a center bearing for the turntable, a sleeve having a squared opening extending centrally through said bearings, a gear having a squared opening located adjacent one of said bearings, a drive shaft having a squared end slidably mounted in said squared openings, a driving connection between the lower end of said shaft and the wheels, and a power connection for said gear.

3. In a motor vehicle, a chassis, a track on the under side thereof, a truck provided with wheels, a turntable on the truck cooperating with the track, a center bearing for the track and a center bearing for the turntable, a sleeve having a squared opening extending centrally through said bearings, a gear having a squared opening mounted above said bearings, a drive shaft having a squared end slidably mounted in said squared openings, a driving connection between the lower end of said shaft and the wheels, a power connection for said gear.

In testimony whereof I affix my signature.

JOHN T. FLAVIN.

Copies of this patent may be obtained for five cents each, by addressing the "Commissioner of Patents, Washington, D. C."